(12) United States Patent
Loesch

(10) Patent No.: US 10,379,204 B2
(45) Date of Patent: Aug. 13, 2019

(54) METHOD FOR CALIBRATING A MIMO RADAR SENSOR FOR MOTOR VEHICLES

(71) Applicant: Robert Bosch GmbH, Stuttgart (DE)

(72) Inventor: Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 341 days.

(21) Appl. No.: 15/308,131

(22) PCT Filed: Mar. 9, 2015

(86) PCT No.: PCT/EP2015/054822
§ 371 (c)(1),
(2) Date: Nov. 1, 2016

(87) PCT Pub. No.: WO2015/172907
PCT Pub. Date: Nov. 19, 2015

(65) Prior Publication Data
US 2017/0045609 A1 Feb. 16, 2017

(30) Foreign Application Priority Data
May 12, 2014 (DE) .................. 10 2014 208 899

(51) Int. Cl.
*G01S 7/40* (2006.01)
*H04B 17/11* (2015.01)
(Continued)

(52) U.S. Cl.
CPC .......... *G01S 7/4026* (2013.01); *G01S 13/003* (2013.01); *G01S 13/931* (2013.01);
(Continued)

(58) Field of Classification Search
CPC .......... G01S 7/40–4056; G01S 13/003; G01S 13/931; H01Q 21/00; H01Q 1/3283; H01Q 1/3233; H04B 17/11; H04B 17/20
See application file for complete search history.

(56) References Cited

U.S. PATENT DOCUMENTS 9,411,035 B2 * 8/2016 Tsai .......................... G01S 3/74

FOREIGN PATENT DOCUMENTS

| DE | 19937723 A1 | 3/2001 |
|----|-------------|--------|
| JP | 2007139471 A | 6/2007 |

(Continued)

OTHER PUBLICATIONS

Hassanien, Aboulnasr and Sergiy A. Vorobyov. "Transmit/receive beamforming for MIMO radar with colocated antennas." 2009 IEEE International Conference on Acoustics, Speech and Signal Processing (2009): 2089-2092. (Year: 2009).*

(Continued)

*Primary Examiner* — Matthew M Barker
(74) *Attorney, Agent, or Firm* — Norton Rose Fulbright US LLP; Gerard Messina

(57) ABSTRACT

Calibrating an antenna diagram of a MIMO radar sensor, including: before commissioning: storing an antenna diagram that associates with each of several angles a respective control vector that is made up of a transmitting control vector and a receiving control vector; after commissioning: performing a radar measurement to localize an object; checking whether the localized object is a single target or a multiple target; if single: performing a SIMO measurement with each of the transmitting antenna elements; estimating the angle of the object based on the measurement results; calculating a first comparison variable, dependent on the components of the transmitting control vector, for each transmitting antenna element; calculating a second compari- (Continued)

son variable, dependent on the results of the SIMO measurements, for each transmitting antenna element; and correcting the transmitting control vector based on a known relationship between the first and second comparison variables for each transmitting antenna element.

6 Claims, 3 Drawing Sheets

(51) Int. Cl.
    *H01Q 1/32*     (2006.01)
    *G01S 13/93*     (2006.01)
    *H04B 17/20*     (2015.01)
    *G01S 13/00*     (2006.01)

(52) U.S. Cl.
    CPC ......... *H01Q 1/3233* (2013.01); *H01Q 1/3283* (2013.01); *H04B 17/11* (2015.01); *H04B 17/20* (2015.01)

(56) References Cited

FOREIGN PATENT DOCUMENTS

| WO | 2012089385 A1 | 7/2012 |
|----|---------------|--------|
| WO | 2012116876 A1 | 9/2012 |

OTHER PUBLICATIONS

Guetlein, Johanna et al., "Calibration Strategy for a TDM FMCW MIMO Radar System," 2013 IEEE International Conference on Microwaves, Communications, Antennas and Electronic Systems; Oct. 21-23, 2013, pp. 1-5.

International Search Report, dated May 15, 2015, of the corresponding International Application PCT/EP2015/054822 filed Mar. 9, 2015.

* cited by examiner

METHOD FOR CALIBRATING A MIMO RADAR SENSOR FOR MOTOR VEHICLES

FIELD

The present invention relates to a method for calibrating an antenna diagram of a MIMO radar sensor having $N_{tx}$ transmitting antenna elements and $N_{rx}$ receiving antenna elements.

BACKGROUND INFORMATION

Radar sensors are often used in driver assistance systems for vehicles, for example in systems for automatic spacing control or in collision warning systems, to detect the traffic environment. In addition to the distance and relative speed, the azimuth angle of localized objects is generally also important since, for example when localizing preceding vehicles, the azimuth angle makes possible a lane allocation. The elevation angle of the localized objects can also be important, since it allows a conclusion as to the relevance of the target, for example whether the target can be driven over or under or is an obstacle representing a potential collision hazard.

The azimuth angles and elevation angles of the targets can be ascertained from amplitudes and/or phase differences of transmitting and/or receiving antennas of an antenna array. in order to improve the accuracy and separation capability of the angle estimate, it is possible to use radar sensors that operate on the multiple input-multiple output (MIMO) principle. Unlike with conventional single input-multiple output (SIMO) radar sensors—which work with one transmitting antenna and multiple receiving antennas—multiple transmitting antenna elements and multiple receiving antenna elements are used. In order to allow the signals of the transmitting antenna elements to be separated at the receiving antenna elements, the transmitted signals must be uncorrelated (orthogonal). This can be achieved by time multiplexing, frequency multiplexing, or code multiplexing.

In the context of angle estimation, the received signals are compared with a previously established angle-dependent antenna diagram. For the case in which only a single target is being localized (or multiple targets that can nevertheless be clearly distinguished from one another based on spacing and relative speed), the estimated angle is obtained as the position of the best agreement between the received signal and the antenna diagram. For the general case of multiple-target estimation, special estimating algorithms are known which supply estimated values for the localization angles of all the targets involved.

It has previously been usual to establish the antenna diagrams for each individual sensor at the factory prior to commissioning of the sensor. When the radar sensor is installed in a motor vehicle, for example behind a bumper or behind a relief structure such as an emblem of the motor vehicle brand, distortions of the antenna diagram can occur and can cause systematic errors in the angle estimate. This applies in particular to the transmitting antenna diagrams for MIMO radar sensors.

SUMMARY

An object of the present invention is to enable more accurate angle estimation with MIMO radar sensors.

This object is achieved according to the present invention by a method for calibrating an antenna diagram of a MIMO radar sensor having $N_{tx}$ transmitting antenna elements and $N_{rx}$ receiving antenna elements, which method encompasses the following steps:

before commissioning of the radar sensor:
storing an antenna diagram that associates with each of several angles θ a respective control vector $\underline{a}(θ)$ that is made up of a transmitting control vector $\underline{a}_{tx}(θ)$ and a receiving control vector $\underline{a}_{rx}(θ)$;

after commissioning:
performing a radar measurement to localize an object;
checking whether the localized object is a single target or a multiple target;
if it is a single target:
performing a SIMO measurement with each of the transmitting antenna elements;
estimating the angle θ of the object based on the measurement results;
calculating a first comparison variable, dependent on the components of the transmitting control vector $\underline{a}_{tx}(θ)$, for each transmitting antenna element;
calculating a second comparison variable, dependent on the results of the SIMO measurements, for each transmitting antenna element; and
correcting the transmitting control vector $\underline{a}_{tx}(θ)$ on the basis of a known relationship between the first and second comparison variables for each transmitting antenna element.

This method allows calibration or post-calibration of the transmitting antenna diagram even after commissioning of the radar sensor, so that interfering influences that occur only after installation of the radar sensor in the vehicle, and therefore cannot be captured in the context of calibration at the factory, can be compensated for later on. For example, when a single object is localized at a specific azimuth angle θ while the motor vehicle in which the radar sensor is installed is being driven, then according to the method described above, the transmitting antenna diagram can be post-calibrated for that specific azimuth angle. Because single objects are localized at different azimuth angles θ over time as the motor vehicle is operated, a corrected (calibrated) transmitting antenna diagram for the entire azimuth angle range is thus gradually obtained. The calibration phase can then be completed. Optionally, however, it is also possible to proceed continuously with post-calibration, or to repeat it at certain intervals, so that age-related changes in the antenna diagram can also be taken into account.

In the method described above, only the transmitting section of the antenna diagram is calibrated. Also a subject of the invention, however, is a method that proceeds analogously and in which the receiving section of the antenna diagram is calibrated with the aid of several multiple input-single output (MISO) measurements.

Also, one aspect of the present invention is a radar sensor for motor vehicles, in which sensor one of the above-described methods is implemented.

An exemplifying embodiment is explained in further detail below with reference to the figures.

DETAILED DESCRIPTION OF EXAMPLE EMBODIMENTS

Figure 1:
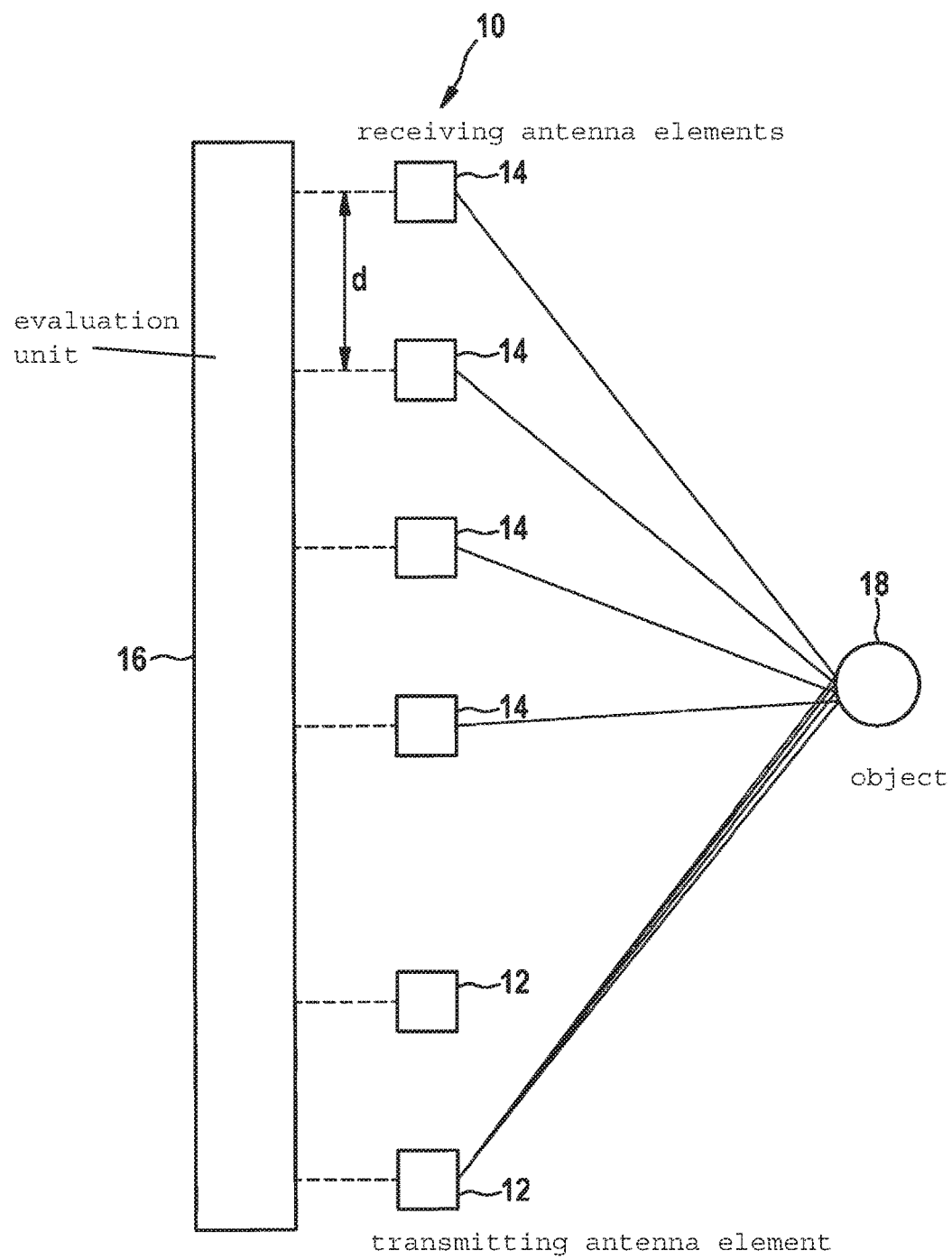
FIG. 1 is a diagram of a MIMO radar sensor having two transmitting antenna elements and four receiving antenna elements.

FIG. 1 is a diagram of a very simple example of a (MIMO) radar sensor 10 that, in this example, has only two transmitting antenna elements 12 and four receiving antenna elements 14. Transmitting antenna elements 12 are powered by a control and evaluation unit 16, and emit radar signals that are reflected at an object 18 and are received by each of the receiving antenna elements 14. The received signals are evaluated separately in control and evaluation unit 16.

What has been depicted here, simply for reasons of clarity, is a bistatic antenna system in which transmitting antenna elements 12 are different from receiving antenna elements 14. A monostatic antenna concept, in which the same antenna elements are used for transmission and for reception, can also be used in practice. The number of transmitting and receiving antenna elements can also be appreciably greater in practice than in the example shown here.

In this example receiving antenna elements 14 are disposed at regular intervals along a line (uniform linear array, ULA). The same is also true of transmitting antenna elements 12; the transmitting and receiving antenna elements do not necessarily need to be disposed on the same line. If the radar sensor is intended to be used to measure azimuth angles of the objects, the lines on which the antenna elements are disposed extend horizontally. In the case of a sensor for measuring elevation angles, conversely, the antenna elements would be disposed on vertical lines. Also possible is a two-dimensional antenna array with which both azimuth angles and elevation angles can be measured.

In the example shown, radar sensor 10 is operated using the time multiplexing method. In other words, only one of the $N_{tx}$ (=2) transmitting antenna elements 12 is active at each point in time. The activity phases of the individual antenna elements alternate cyclically with one another. FIG. 1 symbolically depicts the case in which only the lower of the two transmitting antenna elements 12 is active.

Alternatively, the radar sensor could also be operated using the frequency multiplexing method. All the transmitting antenna elements 12 would then be active simultaneously, but would operate at slightly different frequencies so that the signals of the various transmitting antenna elements can be separated again on the receiving side.

A further possibility would be the code multiplexing method. Here a specific code is modulated onto the signal transmitted by each of the transmitting antenna elements 12, and the signals are separated from one another on the receiving side by code-selective filtering.

Figure 2:
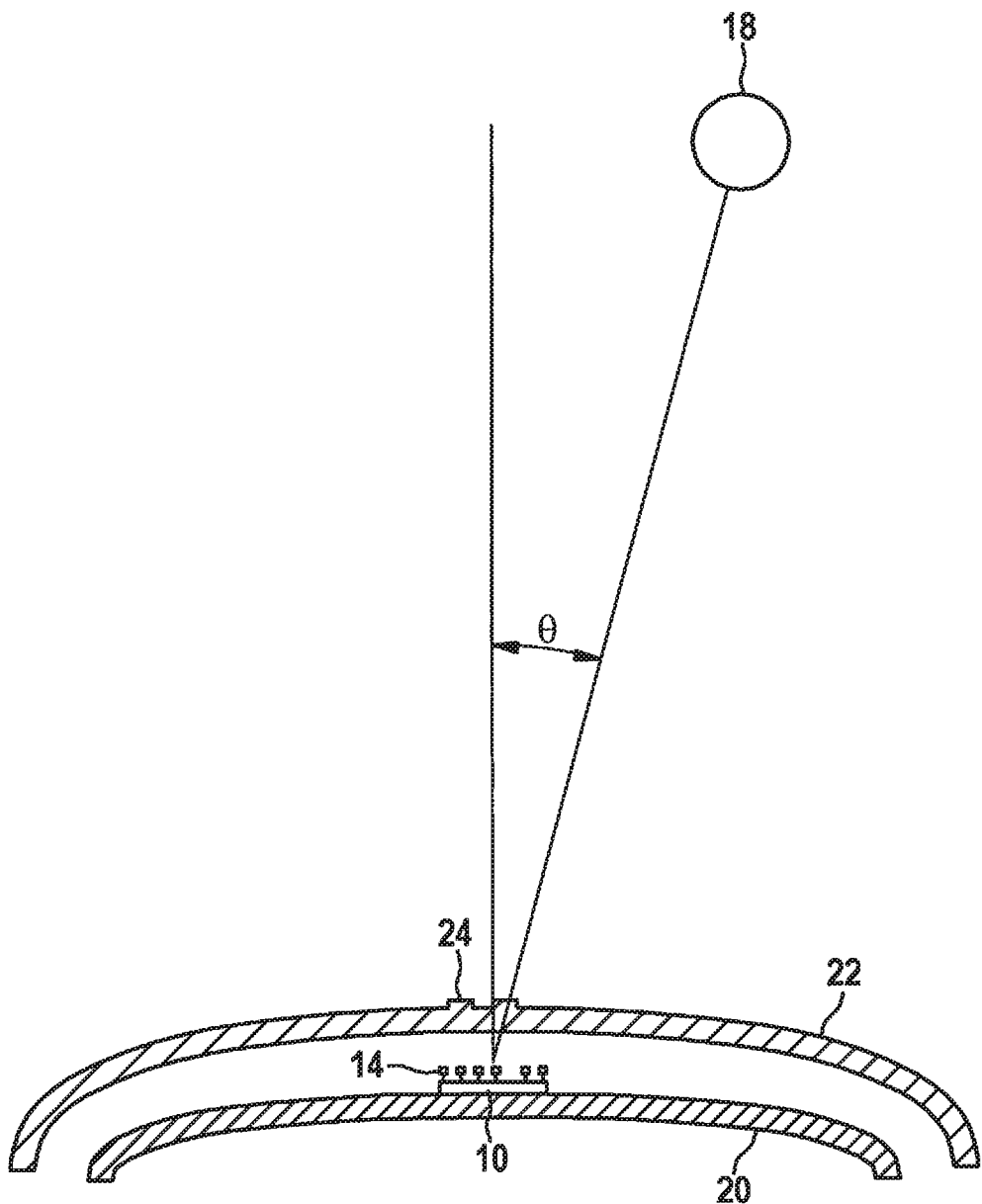
FIG. 2 is a diagram of the radar sensor according to FIG. 1 after installation in a motor vehicle and during localization of an object.

The time multiplexing method will be considered hereinafter for explanatory purposes. In a simple signal model it can be assumed that object 18 is a point-like scattering center at which the signal emitted from the active transmitting antenna element 12 is scattered as a spherical wave that then reaches the various receiving antenna elements 14. The distance between radar sensor 10 and object 18 is, however, unrealistically short in FIG. 1. In practice, this distance is so great that the dimensions of radar sensor 10 are negligibly small compared with the object distance. Somewhat more realistic conditions are shown in FIG. 2, where object 18 is located at a greater distance in front of the front portion of a motor vehicle 20 on which radar sensor 10 is disposed. The radar waves arriving at the location of the radar sensor can then be regarded, to a good approximation, as planar waves that reach all the receiving antenna elements 14 at practically the same angle of incidence—the (azimuth) angle θ of object 18.

The term $\underline{xn}$ is intended to designate the four-component vector whose components ($x_{n,1}$, $x_{n,2}$, $x_{n,3}$, $x_{n,4}$) indicate the complex amplitudes of the signals that are transmitted by the n-th transmitting antenna element 12 and are received by the four receiving antenna elements 14. If d is the distance from one antenna element to another, λ is the wavelength of the radar radiation, and $s=x_{n,1}$ is the (time-dependent) complex amplitude of the signal that is received by the first of receiving antenna elements 14 (for example, the antenna element located farthest to the right in FIG. 2), then the differences in path length between the signals that reach the various receiving antenna elements 14 result in the following equation:

$$\underline{xn}(\theta) = s(1, e^{-2\pi i(d/\lambda)\sin(\theta)}, e^{-2\pi i(2d/\lambda)\sin(\theta)}, e^{-2\pi i(3d/\lambda)\sin(\theta)})^T = s\underline{a}_{rx}(\theta). \quad (1)$$

The superscripted symbol "T" is intended to denote transposition, since vectors are described here as row vectors but are to be regarded as column vectors. The vector $\underline{a}_{rx}$ is referred to as a "receiving control vector." This control vector indicates the geometric properties and wave propagation properties of the particular receiving antenna array being considered. A control vector of this kind can be defined not only for ULA antenna arrays but also very generally for other antenna configurations.

It is correspondingly also possible to define, for the array of (in this example, only two) transmitting antenna elements 12, a control vector $\underline{a}_{tx}$ that in this example would substantially indicate the differences in path length of the optical paths from transmitting antenna elements 12 to object 18.

The control vector obtained for the MIMO antenna array as a whole is $$\underline{a}(\theta) = \underline{a}_{tx}(\theta) * \underline{a}_{rx}(\theta). \quad (2)$$

The symbol * here denotes the Kronecker product. In the exemplifying case considered here, therefore:

$$\underline{a}(\theta) = (a_{tx,1}\ a_{rx,1}, a_{tx,2}\ a_{rx,2}, a_{tx,3}\ a_{rx,3}, \quad (3)$$

$$a_{tx,4}\ a_{rx,4}, a_{tx,2}\ a_{rx,1}, a_{tx,2}\ a_{rx,2}, a_{tx,2}\ a_{rx,3}, a_{tx,2}\ a_{rx,4})^T.$$

The received signals constitute a vector $\underline{x}$ having $N_{tx}\ N_{rx}$ components (eight components in this example), and the following applies:

$$\underline{x}(\theta) = s\ \underline{a}(\theta) \quad (4).$$

A knowledge of the control vector $\underline{a}(\theta)$ makes it possible to create an (under suitable conditions, unequivocal) correlation between the angle θ of the object and the received signals $\underline{x}$, and to infer the azimuth angle θ of the object from the amplitude relationships and phase relationships of the received signals. But because the received signals will in practice be more or less affected by noise, the azimuth angle cannot be exactly calculated but can only be estimated, for example using a maximum likelihood estimate.

If this principle is generalized to multiple-target estimates, the individual angle θ becomes a vector $\underline{\theta}$ whose components indicate the angles of the various targets, the control vector $\underline{a}$ becomes a control matrix A, and the relevant equation is $$\underline{x} = A\underline{\theta} \quad (5).$$

In principle, for a given radar sensor the antenna diagram, i.e. the totality of all control vectors $\underline{a}(\theta)$ for all relevant azimuth angles $\theta$, can be established before the sensor is commissioned. In the example shown in FIG. 2, however, radar sensor 10 is installed behind a bumper 22 of the motor vehicle, and this bumper 22 furthermore has a certain relief 24, for example because an emblem of the motor vehicle brand is impressed or embossed. Because the optical density of the bumper is different from the optical density of air, refraction of the radar waves at and in bumper 22 causes path length differences that have an influence on the antenna diagram. This influence depends on the exact installation location of the radar sensor relative to relief 24, and is therefore difficult to compensate for computationally, especially since effects such as soiling of the bumper can further distort the antenna diagram.

An object of the present invention is thus to find a way to calibrate the antenna diagram at a later time, after the radar sensor is installed on the vehicle, so that such distortions of the antenna diagram do not result in appreciable errors in angle estimation.

Firstly a possibility will be described for post-calibrating the transmitting control vector $\underline{a}_{tx}(\theta)$. It is useful in this context to define relative control vectors $\underline{a}'_{tx}(\theta)$ and $\underline{a}'_{rx}(\theta)$:

$$\underline{a}'(\theta) := \underline{a}'_{tx}(\theta)/a_{tx,1}(\theta) \quad (6)$$

and $$\underline{a}'_{rx}(\theta) := a_{tx,1}(\theta)\underline{a}_{rx}(\theta) \quad (7).$$

Based on equation (2), $$\underline{a}(\theta) := \underline{a}'_{tx}(\theta)\underline{a}'_{rx}(\theta) \quad (8).$$

since the factor $\underline{a}'_{tx}(\theta)$ condenses out of this. Post-calibration of the relative transmitting control vector $\underline{a}'_{tx}(\theta)$ is therefore equivalent to a post-calibration of the original transmitting control vector $\underline{a}_{tx}(\theta)$.

The quality of an angle estimate is described by the so-called quality function $q(\underline{\theta})$. This function is an indicator of the probability that the estimated values ascertained using the estimation algorithm correspond to the actual angular positions of the localized objects. For the general case of a multiple-target estimate, in which multiple targets that are not distinguishable on the basis of their distances and relative speeds are localized at different angles $\theta_j$, the quality function is defined by the equation $$q^2(\underline{\theta}) = \underline{x}^H P_A(\theta)\underline{x} \quad (9),$$

in which $\underline{x}$ is the vector of the signals obtained with the various combinations of transmitting and receiving antenna elements, $\underline{x}^H$ is the vector Hermitian-conjugated with $\underline{x}$, and $P_A(\underline{\theta}) = A(A^H A)^{-1} A^H$, where A is the control matrix that contains the control vectors of all the targets. The control matrix can optionally also contain multiple control vectors for the same target if, as a result of reflections from guard rails or the like, multiple optical paths lead from the same target to the radar sensor.

In the case of a single target having only one path, this equation is simplified to $$q^2(\theta) = \|\underline{a}^H(\theta)\underline{x}\|^2 / (\|\underline{a}(\theta)\|^2 \|\underline{x}\|^2). \quad (10)$$

The control vector $\underline{a}(\theta)$ can be measured and normalized before commissioning of the radar sensor. The signal sector $\underline{x}$ can likewise be respectively normalized once measurement has occurred. It will therefore be assumed hereinafter that both the control vector and the signal vector are normalized, thereby simplifying the equation even further to $$q^2(\theta) = \|\underline{a}^H(\theta)\underline{x}\|^2. \quad (11)$$

The vector x can be described as $$x = \{xi\}, i = 1 \ldots N_{tx} \quad (12),$$

in which $\underline{xi}$ are the vectors that indicate the measured signals that were transmitted by the i-th transmitting antenna element and were received by the $N_{rx}$ receiving antenna elements. For a (single-target) MIMO angle estimate using all the transmitting antenna elements 12, the quality function is then obtained as:

$$q^2(\theta) = \|\underline{a}^H(\theta)\underline{x}\|^2 = \left|\sum_i a^*_{tx,i}(\theta)\underline{a}^H_{rx}(\theta)\underline{xi}\right|^2, \quad (13)$$

in which the sum is over all $N_{tx}$ transmitting antenna elements (summation index i), and $a_{tx,i}^*(\theta)$ is the complex conjugate of the individual components $a_{tx,i}(\theta)$ of the transmitting control vector $\underline{a}_{tx}(\theta)$. The last transformation in equation (13) follows from equation (2).

If variables $y_i(\theta)$ are then defined as $$y_i(\theta) = \underline{a}_{rx}^H(\theta)\underline{xi} \quad (14),$$

it then follows from equation (13) that $$q^2(\theta) = \left|\sum_i a^*_{tx,i}(\theta) y_i(\theta)\right|^2. \quad (15)$$

For a single-target SIMO angle estimate that is executed only with the i-th transmitting antenna element, the following is obtained (with normalization):

$$q^2 = \|y_i(\theta)\|^2 / \|\underline{xi}\|^2. \quad (16).$$

Based on this angle quality it is then possible to decide whether a single-target situation or multiple-target situation exists with regard to the angle estimate. The quality function will have an appreciably lower value for the multiple-target situation. The decision can therefore be made using the criterion that the quality function for the estimated angle $\theta$ is below a suitably selected threshold value.

Alternatively, however, other methods and criteria can be employed in order to decide between a single-target situation and a multiple-target situation.

If signal noise is ignored, the following (approximately) describes the true angle $\theta$:

$$\underline{xi} = s a_{tx,i}(\theta) \underline{a}_{rx}(\theta) \quad (17)$$

where s represents the complex amplitude of the signal emitted from the target, and $\theta$ is the actual angle of the target.

Using equation (17) in equation (14), the result is:

$$y_i(\theta) = \underline{a}_{rx}^H(\theta) s a_{tx,i}(\theta) \underline{a}_{rx}(\theta) \quad (18).$$

Because $\underline{a}_{rx}(\theta)$ is normalized, this is simplified to:

$$y_i(\theta) = s\ a_{tx,i}(\theta) \quad (19).$$

If SIMO measurements are then carried out successively using each of the transmitting antenna elements 12, $N_{tx}$ correlations of the kind indicated in equation (19) are then obtained. It is not yet possible, however, to check directly whether and how accurately these equations (19) are satisfied, since the amplitude s is not known. This problem can nevertheless be circumvented by respectively dividing the vectors on the left and the right side of equation (19) by a single one of their components (with no limitation as to generality, by the first component $a_{tx,1}(\theta)$ and $y_1(\theta)$, respectively). What is obtained is then:

$$a_{tx,n}(\theta)/a_{tx,1}(\theta) = y_n(\theta)/y_1(\theta) \quad (20).$$

The variables on the left side of equation (20) are the components of the relative transmitting control vector $a_{tx}'(\theta)$. The variables on the right side are obtained, using equation (14), from the measurement results $\underline{xi}$ and the known receiving control vector $\underline{a}_{rx}(\theta)$ that was originally used.

Post-calibration can therefore easily be accomplished by replacing the previously used relative transmitting control vector $\underline{a}_{tx}'(\theta)$ with the vector having the components $y_n(\theta)/y_1(\theta)$. It is also simple to determine, based on the discrepancy between the old and the new relative transmitting control vector, how severely the previously used antenna diagram was distorted.

With the procedure described above, firstly a coherent summation $(y_i(\theta) = \underline{a}_{rx}^H(\theta) \underline{xi})$ must be performed, and then the ratio $y_n(\theta)/y_1(\theta)$ is calculated. In general, however, a tolerably small error occurs if the calculation is simplified by first calculating the ratios $x_{n,k}/x_{1,k}$ and then averaging over all k (i.e. over all receiving antenna elements). As an approximation, instead of equation (20) the following relationships can also be used:

$$a_{tx,n}(\theta)/a_{tx,1}(\theta) = (1/N_{rx}) \Sigma_k (x_{n,k}/x_{1,k}) \quad (21)$$

in which $x_{n,k} = (\underline{xn})_k = x_j$, where $j = (k-1)N_{tx} + n$, the n-th component of the partial vector $\underline{xn}$ of $\underline{x}$.

The method according to the present invention therefore encompasses in essence the following steps:
- calculating a first comparison variable dependent on the components of the transmitting control vector $\underline{a}_{tx}(\theta)$ (e.g. $a_{tx,n}(\theta)/a_{tx,1}(\theta)$) for each transmitting antenna element (having the index n);
- calculating a second comparison variable dependent on the results of the SIMO measurements (e.g. $y_n(\theta)/y_1(\theta)$ or $\Sigma_k(x_{n,k}/x_{1,k})$) for each transmitting antenna element; and
- correcting the transmitting control vector $\underline{a}_{tx}(\theta)$ (or, equivalently thereto, the relative transmitting control vector $\underline{a}'_{tx}(\theta)$) based on a known relationship (equation (20) or (21)) between the first and second comparison variables for each transmitting antenna element.

An analogous method also allows calibration or post-calibration of the receiving antenna diagram, i.e. of the receiving control vector $\underline{a}_{rx}$.

What is then obtained instead of equation (13) is:

$$q^2(\theta) = \left| \sum_i a_{tx,i}^*(\theta) \underline{a}_{rx}^H(\theta) \underline{xi} \right|^2 = |\underline{a}_{rx}^H(\theta) \underline{x}'(\theta)|^2 \quad (22)$$

where $$\underline{x}'(\theta) = \Sigma_i a_{tx}^*(\theta) \underline{xi} \quad (23)$$

and, analogously to equation (12), $$\underline{x}' = \{\underline{xn}'\},\ n = 1 \ldots N_{rx} \quad (24).$$

For a single-target MISO (multiple input-single output) angle estimate that is performed only with the n-th receiving antenna element, the following is obtained (with normalization):

$$q^2 = \|\underline{xn}'\|^2 / \left( \sum_i |\underline{xn}'_i|^2 \right)^{-1/2}. \quad (25)$$

Again, a decision can be made on the basis of the angle quality as to whether a single-target situation or a multiple-target situation exists in the context of the angle estimate.

If a single-target situation exists and if signal noise is ignored, the true angle $\theta$ is then approximately described by:

$$\underline{xi} = s a_{tx,i}(\theta) \underline{a}_{rx}(\theta) \quad (26).$$

A calculation analogous to equations (18) to (20) then yields:

$$a_{rx,n}(\theta)/a_{rx,1}(\theta) = x'_n(\theta)/x'_1(\theta). \quad (27)$$

In this case the first comparison variables are therefore the components $a_{rx,n}(\theta)/a_{rx,1}(\theta)$ of a relative receiving control vector $\underline{a}''_{rx}$ (defined analogously to equation (6)). The second comparison variables, which are now dependent on the results of the MISO measurements, are calculated using the variables $x'_n(\theta)/x'_1(\theta)$ for each receiving antenna element (index n).

In this case as well, the comparison variables and relationships analogous to equation (21) can be used as a good approximation:

$$a_{rx,n}(\theta)/a_{rx,1}(\theta) = (1/N_{tx}) \sum_k (x_{k,n}/x_{k,1}). \quad (28)$$

Figure 3:
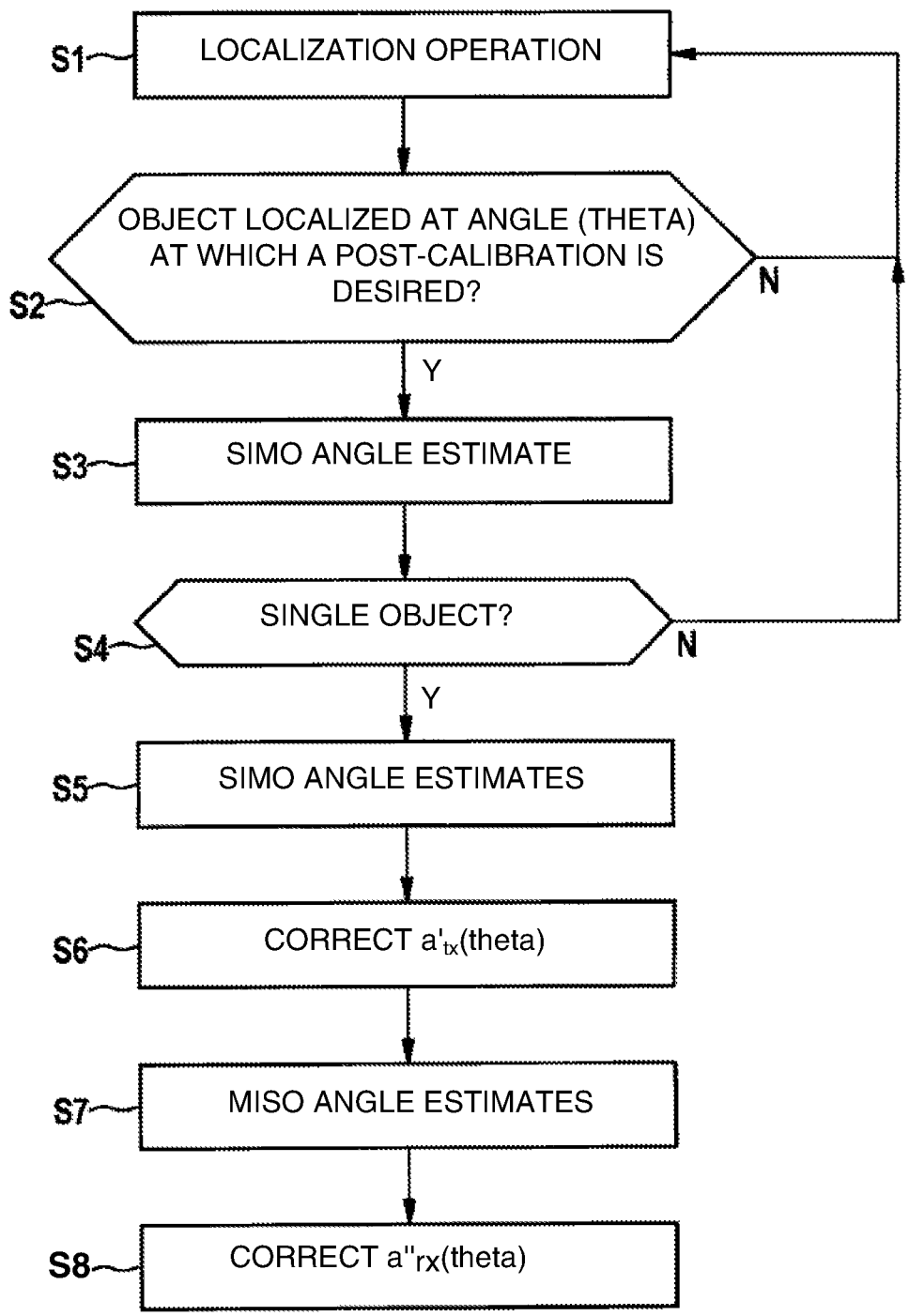
FIG. 3 is a flow chart of a method for calibrating the radar sensor.

FIG. 3 depicts a complete calibration procedure that can be performed while the motor vehicle that has radar sensor 10 is being driven.

In step S1, firstly normal localization operation is carried out, i.e. objects in the surroundings of the vehicle are localized with the aid of radar sensor 10. For the localized objects, multiple-target angle estimates are carried out on the basis of the antenna diagram that was originally established upon commissioning of the radar sensor or was recalibrated in previous post-calibration procedures.

Step S2 checks whether, in the current localization cycle, an object was localized at an angle for which a post-calibration had not yet taken place, or for which the most recent post-calibration was already some time in the past.

If so (Y), then in step S3 a SIMO measurement and an angle estimate using one of the transmitting antenna elements 12 is performed. Otherwise (N) execution jumps back to step S1, and the loop having steps S1 and S2 is cycled through until an object is found at an angle for which a post-calibration needs to take place.

Based on the angle quality of the SIMO angle estimate carried out in step S3, a decision is made in step S4 as to whether or not the object localized at the angle θ is a single object.

If it is not a single object (N), execution again jumps back into the loop having steps S1 and S2. If it is a single object (Y), then in step S5 further SIMO measurements are performed with all the transmitting antenna elements 12. A complete set of the variables $y_i(\theta)$ for all the transmitting antenna elements is thereby obtained. Based on the comparison variables calculated therefrom, in step S6 the (relative) transmitting control vector $a'_{tx}(\theta)$ is then corrected (recalibrated).

Optionally a step S7 can also be added, in which MISO measurements using all the receiving antenna elements are carried out for the same object. In step S8 the (relative) receiving control vector $a''_{rx}(\theta)$ is then corrected on the basis of those measurements.

If the time multiplexing method is used, the time intervals between the individual SIMO measurements or MISO measurements should not be too long, so that errors caused by any location shifts of the object in the time elapsing between the measurements do not produce a significant error. It is possible, however, to interleave the measurements in time, and/or to combine the measurement results, in such a way that the errors caused by time shifts are averaged out.

An analogous problem also occurs with the frequency multiplexing method, since here the distance to the target, in conjunction with the frequency shift between the transmitting antenna elements, can result in a phase difference between the variables $y_i(\theta)$ which may need to be compensated for.

What is claimed is:

1. A method for calibrating an antenna diagram of a multiple input, multiple output (MIMO) radar sensor having $N_{tx}$ transmitting antenna elements and $N_{rx}$ receiving antenna elements, comprising:
before commissioning of the radar sensor:
storing an antenna diagram that associates with each of a plurality of several angles θ a respective control vector a(θ) that is made up of a transmitting control vector $a_{tx}(\theta)$ and a receiving control vector $a_{rx}(\theta)$;
after commissioning:
performing a radar measurement to localize an object;
checking whether the localized object is a single target or a multiple target;
if the localized object is a single target:
performing a single input, multiple output (SIMO) measurement with each of the transmitting antenna elements;
estimating the angle θ of the object based on the measurement results;
calculating a first comparison variable, dependent on the components of the transmitting control vector $a_{tx}(\theta)$, for each transmitting antenna element;
calculating a second comparison variable, dependent on the results of the SIMO measurements, for each transmitting antenna element; and
correcting the transmitting control vector $a_{tx}(\theta)$ on the basis of a known relationship between the first and second comparison variables for each transmitting antenna element.

2. The method as recited in claim 1, wherein the following relationships are used to correct the transmitting control vector $a_{tx}(\theta)$:

$$a_{tx,n}(\theta)/a_{tx,1}(\theta)=y_n(\theta)/y_1(\theta)$$

where $a_{tx,n}(\theta)$ are the components of the transmitting control vector $\underline{a}_{tx}(\theta)$, $a_{tx,1}(\theta)$ is any one of those components, and the variables $y_n(\theta)$ for all n=1 ... $N_{tx}$ are defined by $$y_i(\theta)=\underline{a}_{rx}^H(\theta)\underline{xi}$$

where $\underline{a}_{rx}^H(\theta)$ is the vector Hermitian-conjugated with the receiving control vector $\underline{a}_{rx}(\theta)$ and $\underline{xi}$ is a vector whose components indicate complex amplitudes of signals that were transmitted by the i-th transmitting antenna element and were received by the $N_{rx}$ receiving antenna elements.

3. The method as recited in claim 1, wherein the following relationships are used to correct the transmitting control vector $a_{tx}(\theta)$:

$$a_{tx,n}(\theta)/a_{tx,1}(\theta)=(1/N_{rx})\Sigma_k(x_{n,k}/x_{1,k})$$

where $a_{tx,n}(\theta)$ are the components of the transmitting control vector $\underline{a}_{tx}(\theta)$, $a_{tx,1}(\theta)$ is any one of those components, and the variables $x_{n,k}$ indicate complex amplitudes of signals that were transmitted by the n-th transmitting antenna element and were received by the k-th receiving antenna element.

4. A method for calibrating an antenna diagram of a multiple input, multiple output (MIMO) radar sensor having $N_{tx}$ transmitting antenna elements and $N_{rx}$ receiving antenna elements, the method comprising:
before commissioning of the radar sensor:
storing an antenna diagram that associates with each of a plurality of several angles θ a respective control vector a(θ) that is made up of a transmitting control vector $a_{tx}(\theta)$ and a receiving control vector $a_{rx}(\theta)$,
after commissioning:
performing a radar measurement to localize an object;
checking whether the localized object is a single target or a multiple target;
if the localized object is a single target:
performing a multiple input, single output (MISO) measurement with each of the transmitting antenna elements;
estimating the angle θ of the object based on the measurement results;
calculating a first comparison variable, dependent on the components of the receiving control vector $a_{rx}(\theta)$, for each receiving antenna element;
calculating a second comparison variable, dependent on the results of the MISO measurements, for each receiving antenna element; and
correcting the receiving control vector $a_{rx}(\theta)$ on the basis of a known relationship between the first and second comparison variables for each receiving antenna element.

5. The method as recited in claim 4, wherein the following relationships are used to correct the receiving control vector $\underline{a}_{rx}(\theta)$:

$$a_{rx,n}(\theta)/a_{rx,1}(\theta) = x'_n(\theta)/x'_1(\theta)$$

where $a_{rx,n}(\theta)$ are the components of the receiving control vector $\underline{a}_{rx}(\theta)$, $a_{rx,1}(\theta)$ is any one of those components, and the variables $x'_n(\theta)$ for all $n=1 \ldots N_{rx}$ are defined by)

$$x_n^1(\theta) = \Sigma_i a_{tx,i}^*(\theta)\underline{xi}_n$$

where $\underline{a}_{tx,i}(\theta)$ is the i-th component of the transmitting control vector $\underline{a}_{tx}(\theta)$ and $\underline{xi}$ is a vector whose components indicate complex amplitudes of signals that were transmitted by the i-th transmitting antenna element and were received by the $N_{rx}$ receiving antenna elements.

6. The method as recited in claim 4, wherein the following relationships are used to correct the receiving control vector $\underline{a}_{rx}(\theta)$:

$$a_{tx,n}(\theta)/a_{tx,1}(\theta) = (1/N_{rx})\Sigma_k(x_{n,k}/x_{1,k})$$

where $a_{rx,n}(\theta)$ are the components of the receiving control vector $\underline{a}_{rx}(\theta)$, $a_{rx,1}(\theta)$ is any one of those components, and the variables $x_{k,n}$ indicate complex amplitudes of signals that were transmitted by the k-th transmitting antenna element and were received by the n-th receiving antenna element.

* * * * *